US011320994B2

(12) United States Patent
Patel et al.

(10) Patent No.: US 11,320,994 B2
(45) Date of Patent: May 3, 2022

(54) DYNAMIC CONFIGURATION CHANGE CONTROL IN A STORAGE SYSTEM USING MULTI-PATH LAYER NOTIFICATIONS

(71) Applicant: EMC IP Holding Company LLC, Hopkinton, MA (US)

(72) Inventors: Rimpesh Patel, Bangalore (IN); Amit Pundalik Anchi, Bangalore (IN); Peniel Charles, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/024,830

(22) Filed: Sep. 18, 2020

(65) Prior Publication Data

US 2022/0091761 A1 Mar. 24, 2022

(51) Int. Cl.
*G06F 3/06* (2006.01)
(52) U.S. Cl.
CPC ............ *G06F 3/0629* (2013.01); *G06F 3/061* (2013.01); *G06F 3/067* (2013.01); *G06F 3/0655* (2013.01)
(58) Field of Classification Search
None
See application file for complete search history.

(56) References Cited

U.S. PATENT DOCUMENTS

| 6,567,397 B1 | 5/2003 | Campana et al. |
| 6,687,746 B1 | 2/2004 | Shuster et al. |
| 6,697,875 B1 | 2/2004 | Wilson |
| 6,968,401 B2 * | 11/2005 | McBrearty ............ G06F 13/102 710/38 |
| 7,275,103 B1 | 9/2007 | Thrasher et al. |

(Continued)

FOREIGN PATENT DOCUMENTS

| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Edward J Dudek, Jr.
*Assistant Examiner* — Ralph A Verderamo, III
(74) *Attorney, Agent, or Firm* — Ryan, Mason & Lewis, LLP

(57) ABSTRACT

An apparatus comprises at least one processing device that is configured to monitor, in a multi-path layer thereof, a storage area network (SAN) through which one or more host devices access storage devices of a storage system, and responsive to at least one particular detected condition of the SAN, to generate in the multi-path layer one or more notifications for delivery to the storage system. The storage system implements one or more dynamic configuration changes relating to the SAN based at least in part on the one or more notifications generated in the multi-path layer. The multi-path layer illustratively comprises at least one multi-path input-output driver implemented in a corresponding one of the host devices and configured to control delivery of input-output operations to the storage devices of the storage system over selected ones of a plurality of paths through the SAN.

20 Claims, 4 Drawing Sheets

(56) References Cited

U.S. PATENT DOCUMENTS

| | | |
|---|---|---|
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 8,918,537 B1* | 12/2014 | Sandstrom .......... H04L 12/6418 709/238 |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2012/0254482 A1* | 10/2012 | Kabakura ............. G06F 3/0614 710/38 |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0095445 A1* | 4/2015 | Thankappan ....... H04L 67/1097 709/214 |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0131562 A1* | 5/2018 | Domrow ............. H04L 41/0663 |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0021653 A1 | 1/2020 | Rao et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0401309 A1* | 12/2020 | De Roeck ............. G06F 3/0659 |
| 2021/0149563 A1* | 5/2021 | Devriendt ............. G06F 3/0619 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

U.S. Appl. No. 16/697,393 filed in the name of Vinay G. Rao et al. filed Nov. 27, 2019, and entitled "Automated Seamless Migration of Logical Storage Devices."

U.S. Appl. No. 16/710,828 filed in the name of Amit Pundalik Anchi et al. filed Dec. 11, 2019, and entitled "Automated Seamless Migration with Signature Issue Resolution."

* cited by examiner

DYNAMIC CONFIGURATION CHANGE CONTROL IN A STORAGE SYSTEM USING MULTI-PATH LAYER NOTIFICATIONS

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and NVM Express (NVMe) access protocols.

SUMMARY

Illustrative embodiments provide techniques for dynamic configuration change control in a storage system using multi-path layer notifications. For example, some embodiments are advantageously configured to minimize or otherwise avoid the need for manual administrator intervention in response to dynamic and potentially unpredictable changes in application workload and associated network traffic.

In one embodiment, an apparatus comprises at least one processing device that includes a processor and a memory, with the processor being coupled to the memory. The at least one processing device is configured to monitor, in a multi-path layer thereof, a storage area network (SAN) through which one or more host devices access storage devices of a storage system, and responsive to at least one particular detected condition of the SAN, to generate in the multi-path layer one or more notifications for delivery to the storage system. The storage system implements one or more dynamic configuration changes relating to the SAN based at least in part on the one or more notifications generated in the multi-path layer.

The multi-path layer illustratively comprises at least one multi-path input-output (MPIO) driver implemented in a corresponding one of the host devices and configured to control delivery of IO operations to the storage devices of the storage system over selected ones of a plurality of paths through the SAN, although other types of multi-path layers can be used in other embodiments.

The paths in some embodiments correspond to respective initiator-target pairs, with the initiator of a particular one of the initiator-target pairs comprising a designated host bus adaptor (HBA) of a given one of the host devices and the target of the particular one of the initiator-target pairs comprising a designated storage array port of the storage system.

In some embodiments, the at least one particular detected condition relates to at least one of a plurality of initiator-target pairs.

For example, different MPIO drivers in different ones of the host devices illustratively detect respective different conditions relating to respective different ones of a plurality of initiator-target pairs, and in such an arrangement the one or more notifications generated in the multi-path layer collectively identify a common target from among the targets of the different ones of the initiator-target pairs. The one or more dynamic configuration changes implemented by the storage system in some embodiments comprise one or more dynamic configuration changes that at least temporarily modify one or more characteristics relating to a particular storage array port corresponding to the common target.

In some embodiments, the one or more notifications are delivered directly from one or more MPIO drivers of the multi-path layer to the storage system over the SAN. For example, the one or more notifications may be delivered from the one or more MPIO drivers of the multi-path layer to the storage system in the form of vendor unique commands of a specified storage access protocol, such as a SCSI access protocols or an NVMe access protocol. Other types of commands of other storage access protocols can be used.

Additionally or alternatively, the one or more notifications may be delivered indirectly from one or more MPIO drivers of the multi-path layer to the storage system via one or more external servers. For example, the one or more external servers may comprise a centralized management server coupled to each of the host devices and configured to communicate with the MPIO drivers of the multi-path layer.

In some embodiments, the at least one particular detected condition comprises an absence of receipt by the multi-path layer of fabric performance impact notifications relating to at least one of a plurality of initiator-target pairs.

As another example, the at least one particular detected condition can comprise an increased level of SAN traffic, relative to a normal level of SAN traffic for at least one of a plurality of initiator-target pairs, that is determined by the multi-path layer to be attributable to a host-based migration of one or more storage volumes of the storage system.

In such an embodiment, the one or more notifications illustratively comprise information identifying the at least one initiator-target pair that is experiencing the increased level of SAN traffic.

In some embodiments, the one or more dynamic configuration changes implemented by the storage system illustratively comprise at least one of switching at least one target storage array port of at least one initiator-target pair to a different target storage array port, and executing a zone configuration change. Numerous additional or alternative dynamic configuration changes can be implemented by the storage system based at least in part on one or more notifications generated in the multi-path layer.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
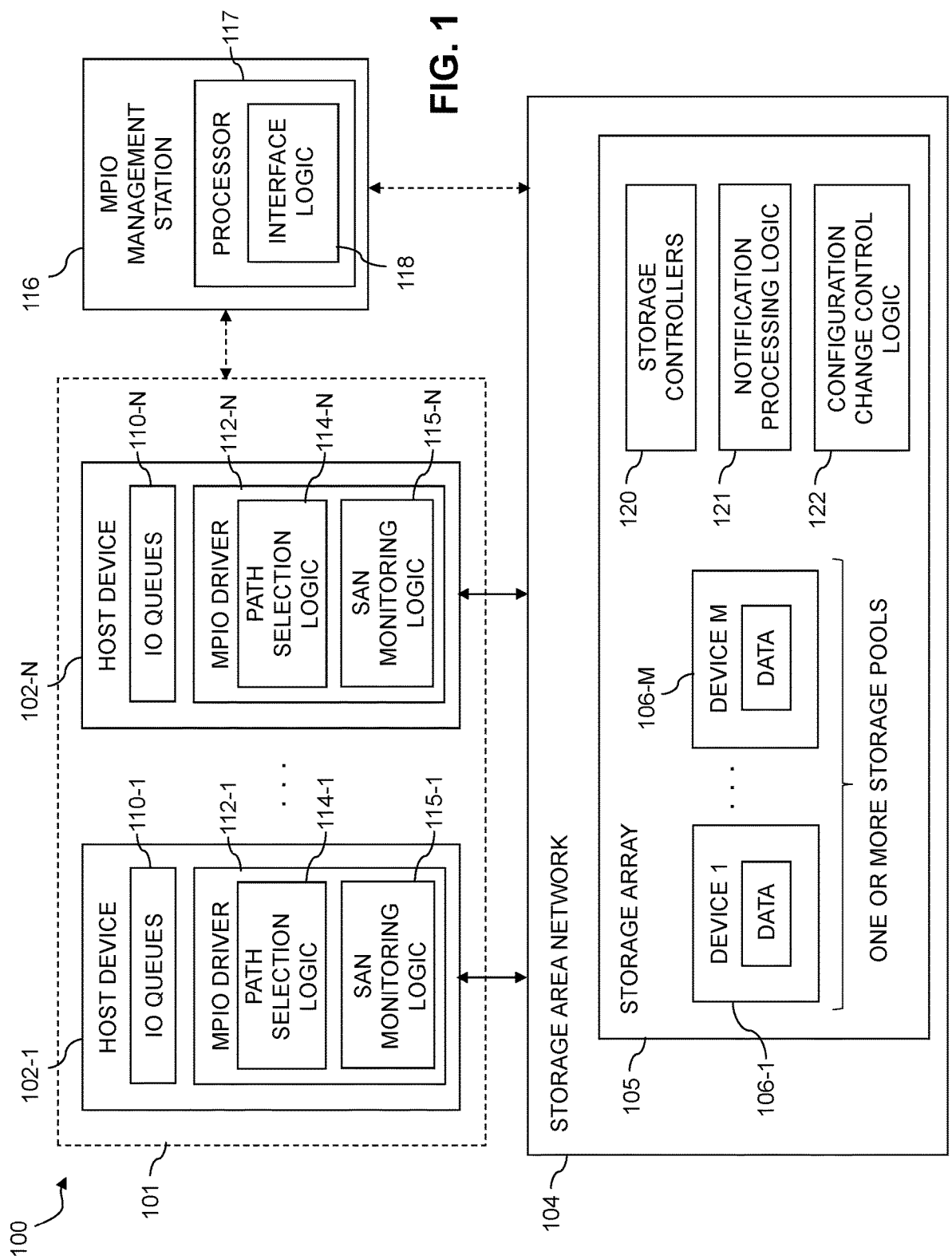
FIG. 1 is a block diagram of an information processing system configured with functionality for dynamic configuration change control using multi-path layer notifications in an illustrative embodiment.

FIG. 1 shows an information processing system 100 configured in accordance with an illustrative embodiment. The information processing system 100 comprises a computer system 101 illustratively comprising a plurality of host devices 102-1, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 over the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or NVM Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (TB), Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. The multi-path layer further provides functionality for dynamic configuration change control. Such functionality is provided at least in part using respective instances of SAN monitoring logic 115-1, . . . 115-N implemented within the MPIO drivers 112.

The MPIO drivers 112 may comprise, for example, otherwise conventional MPIO drivers, such as PowerPath® drivers from Dell EMC, suitably modified in the manner disclosed herein to provide functionality for dynamic configuration change control. Other types of MPIO drivers from other driver vendors may be suitably modified to incorporate functionality for dynamic configuration change control as disclosed herein.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 116 that includes a processor 117 implementing interface logic 118. The interface logic 118 is utilized to communicate with the host devices 102 and the storage array 105. Such an MPIO management station 116 provides management functionality for the multi-path layer comprising the MPIO drivers 112 of the host devices 102. In some embodiments, host device management software executing on the MPIO management station 116 interacts with storage array management software executing on the storage array 105. The MPIO management station 116, or portions thereof, may be considered in some embodiments as forming part of what is referred to herein as a "multi-path layer" that includes the MPIO drivers 112 of the host devices 102. The term "multi-path layer" as used herein is intended to be broadly construed and may comprise, for example, an MPIO layer or other multi-path software layer of a software stack, or more generally multi-pathing software program code, running on one or more processing devices each comprising at least one processor and at least one memory.

The MPIO management station 116 is an example of what is more generally referred to herein as an "external server" relative to the storage array 105. Additional or alternative external servers of different types can be used in other embodiments. In some embodiments, one or more external servers, such as the MPIO management station 116, perform at least a portion of the dynamic configuration change control functionality disclosed herein, illustratively in cooperation with the storage array 105 and the instances of SAN monitoring logic 115 of the respective MPIO drivers 112.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO management station 116 is arranged as an intermediary device relative to the host devices 102 and the storage array 105. Some communications between the host devices 102 and the storage array 105 can occur via such an intermediary device, which as indicated elsewhere herein can alternatively comprise one or more external servers. Such communications illustratively involve utilization of an out-of-band communication mechanism, such as one or more IP connections between the host devices 102 and the MPIO management station 116. The MPIO management station 116 is illustratively connected directly to the storage array 105 using protocols such as SCSI, Internet SCSI (iSCSI), FC, NVMeoFC, NVMe over Fabrics (NVMeoF), NVMe/TCP, and/or others.

The MPIO driver 112-1 on the host device 102-1 illustratively has connectivity to the MPIO management station 116. The MPIO management station 116 in some embodiments implements PowerPath® Management Appliance (PPMA) functionality to obtain access to the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116. Such host multi-pathing software can be configured to facilitate dynamic configuration change control for one or more storage arrays as disclosed herein.

In the FIG. 1 embodiment, the storage array 105 comprises a plurality of storage controllers 120, notification processing logic 121, and configuration change control logic 122. In other embodiments, one or more of the notification processing logic 121 and configuration change control logic 122 can be implemented at least in part external to the storage array 105 rather than internal to the storage array 105. For example, in some embodiments at least portions of the notification processing logic 121 and configuration change control logic 122 are implemented on one or more servers that are external to the storage array 105, such as in the MPIO management station 116 or in another type of external server. Accordingly, such logic components may be located internal to the storage array 105, external to the storage array 105, or implemented in part internally and in part externally to the storage array 105, and can include various combinations of hardware, firmware and software. The term "logic" as used herein is therefore intended to be broadly construed.

Communications between the host devices 102 and the storage array can utilize an in-band communication mechanism in which one or more predetermined commands in a designated storage protocol are sent from the host device 102-1 to the storage array 105. Such predetermined commands can comprise, for example, a log sense command, a mode sense command, a "vendor unique command" or VU command, or combinations of multiple instances of these or other commands, in an otherwise standardized command format, such as a SCSI format or other type of format.

The above-noted command in some embodiments comprises at least one predetermined vendor unique or VU command of a storage access protocol which the host device 102-1 utilizes to communicate with the storage array 105, such as a SCSI or NVMe protocol. A wide variety of different arrangements of commands may be used, as well as numerous associated timing techniques for repeatedly sending such commands from the host device 102-1 to the storage array 105. A "command" as the term is broadly used herein can comprise a combination of multiple distinct commands, such as respective different commands for different ones of a plurality of initiators.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

As indicated above, illustrative embodiments overcome various drawbacks of conventional practice by configuring the system 100 to include functionality for dynamic configuration change control using multi-path layer notifications, as will now be described in more detail.

In operation, a multi-path layer comprising the MPIO drivers 112 of the system 100 is configured to monitor the SAN 104 through which the corresponding host devices 102 access storage devices 106 of the storage array 105, and responsive to at least one particular detected condition of the SAN 104, to generate one or more notifications for delivery to the storage array 105. The storage array 105 implements one or more dynamic configuration changes relating to the SAN 104 based at least in part on the one or more notifications generated in the multi-path layer.

An example of a process including such operations will be described below in conjunction with the flow diagram of FIG. 2. These and other operations referred to herein as being performed by one or more host devices operating in conjunction with one or more storage arrays of a storage system can in other embodiments involve additional or alternative system components, such as one or more external servers such as MPIO management station 116.

The above-noted monitoring and generating are illustratively performed by each of the instances of SAN monitoring logic 115 in respective ones of the MPIO drivers 112 of the multi-path layer. However, it is to be appreciated that additional or alternative components such as MPIO management station 116 can participate in at least one of the monitoring and generating in other embodiments.

The monitoring illustratively involves monitoring traffic over multiple paths through the SAN 104 including traffic comprising storage access protocol commands directed by the host devices 102 to the storage devices 106 over the SAN 104. As indicated previously, such storage access protocol commands can include, for example, at least one of commands in a SCSI access protocol and commands in an NVMe access protocol. As a more particular example, the storage access protocol commands illustratively include SCSI-FC commands and/or NVMeoFC commands, although additional or alternative storage access protocol command types can be used in other embodiments. The storage controllers 120 of the storage array 105 are configured to process the received storage access protocol commands.

As mentioned above, the multi-path layer illustratively comprises at least one of the MPIO drivers 112 implemented in a corresponding one of the host devices 102 and configured to control delivery of IO operations to the storage devices 106 of the storage array 105 over selected ones of a plurality of paths through the SAN 104. Such paths illustratively correspond to respective initiator-target pairs, with the initiator of a particular one of the initiator-target pairs comprising a designated HBA of a given one of the host devices 102 and the target of the particular one of the initiator-target pairs comprising a designated storage array port of the storage array 105. The at least one particular detected condition of the SAN 104 illustratively relates to at least one of the plurality of initiator-target pairs.

For example, in some embodiments, different MPIO drivers 112 in different ones of the host devices 102 detect respective different conditions relating to respective different ones of a plurality of initiator-target pairs. In such an embodiment, the one or more notifications generated in the multi-path layer collectively identify a common target from among the targets of the different ones of the initiator-target pairs.

Moreover, the one or more dynamic configuration changes implemented by the storage array 105 in such an embodiment illustratively comprise one or more dynamic configuration changes that at least temporarily modify one or more characteristics relating to a particular storage array port corresponding to the common target.

In some embodiments, the one or more notifications are delivered directly from one or more MPIO drivers of the multi-path layer to the storage array 105 over the SAN 104. For example, the one or more notifications are illustratively delivered from the one or more MPIO drivers of the multi-path layer to the storage array 105 in the form of vendor unique commands of a specified storage access protocol, such as a SCSI access protocol or an NVMe access protocol, although other storage access protocols and associated command types or notification formats can be used. The term "notification" as used herein is therefore intended to be broadly construed, and a given such notification can be generated, for example, by one of the MPIO driver 112, or by the MPIO management station 116, possibly based on multiple notifications received in the MPIO management station 116 from multiple MPIO drivers 112. The latter arrangement is an example of an arrangement in which the MPIO management station 116 is considered part of the multi-path layer that includes the MPIO drivers 112.

The one or more notifications in some embodiments are delivered indirectly from one or more MPIO drivers 112 of the multi-path layer to the storage array 105 via one or more external servers. For example, the one or more external servers illustratively comprise a centralized management server coupled to each of the host devices 102 and configured to communicate with the MPIO drivers 112 of the multi-path layer. The MPIO management station 116 is considered an example of such a centralized management server.

In some embodiments, the at least one particular detected condition comprises an absence of receipt by the multi-path layer of fabric performance impact notifications (FPINs) relating to at least one of a plurality of initiator-target pairs.

As another example, the at least one particular detected condition in some embodiments comprises an increased level of SAN 104 traffic, relative to a normal level of SAN 104 traffic for at least one of a plurality of initiator-target pairs, that is determined by the multi-path layer to be attributable to a host-based migration or other similar activity involving one or more storage volumes of the storage array 105. In such an embodiment, the one or more notifications illustratively comprise information identifying the at least one initiator-target pair that is experiencing the increased level of SAN 104 traffic.

The one or more dynamic configuration changes implemented by the storage array 105 in some embodiments comprise at least one of switching at least one target storage array port of at least one initiator-target pair to a different target storage array port, such as, for example, a target storage array port experiencing a relatively low level of traffic, or a reserve target storage array port. In conjunction with such a switch, the one or more dynamic configuration changes can further include executing a zone configuration change. Other types of dynamic configuration changes can be implemented, such as, for example, associated masking changes. These and other similar changes are referred to herein as "dynamic" as they can be implemented responsive to particular detected SAN conditions, as well as subsequently reversed once those detected SAN conditions are found to no longer exist. The absence of a previously-detected SAN condition is therefore also considered to be a type of SAN condition that is detectable by a multi-path layer using the techniques disclosed herein.

In some embodiments, techniques for dynamic configuration change as disclosed herein are implemented using PowerPath® notifications or other types of notifications associated with a multi-path layer of one or more host devices 102. For example, some embodiments provide dynamic configuration of paths to target ports of the storage array 105 based on fabric conditions of the SAN 104. At least portions of the disclosed functionality can be managed by a host driver, such as MPIO driver 112-1, in conjunction with processing of IO operations. As described above, the MPIO driver 112-1 is illustratively part of a multi-path layer that configured to process IO operations of at least one host device that communicates with one or more storage arrays or other types of storage systems. An example of an MPIO driver that can be used in some embodiments is a PowerPath® driver from Dell EMC, although other types of host multi-pathing software can be used in other embodiments. It is to be appreciated that references herein to PowerPath® are presented by way of illustrative example only. Also, other types of host drivers can be used in place of or in addition to one or more MPIO drivers.

Illustrative embodiments can therefore provide functionality for dynamic configuration change using PowerPath® notifications, with at least portions of that functionality being implemented using one or more MPIO drivers of a multi-path layer of at least one host device. The MPIO drivers can comprise PowerPath® drivers suitably modified to implement the techniques disclosed herein. Other types of host multi-pathing software from other vendors can be similarly modified to implement the techniques disclosed herein. Again, MPIO drivers are not required, and other types of host drivers can be used.

The MPIO driver 112-1 on the host device 102-1 illustratively has connectivity to the MPIO management station 116, which as noted above may be implemented as a PPMA or other type of management station that has access to the storage array 105, from which the MPIO driver 112-1 can obtain storage array related information.

Some embodiments are configured to support seamless migration, as well as other types of migration, replication and/or backup processes. For example, in PowerPath® Migration Enabler (PPME), and more specifically in PPME-OR, where OR denotes Open Replicator, data of one or more logical storage devices subject to seamless migration is copied from a source array to a target array. Other types of migration, as well as other activities such as replication and backups, can be similarly supported.

As indicated previously, in a datacenter or other type of information processing system, host to storage connectivity is usually implemented via one or more storage SAN fabrics. These SAN fabric configurations can include multiple fabric switches with LUNs made visible to a host through multiple paths based on zone configuration and physical connectivity. The SAN connectivity is designed with redundancy in mind for any unplanned SAN outages. This planning of a datacenter or other information processing system to an extent involves understanding the enterprise application to be hosted and the needs of the storage capacity and SAN bandwidth capacity. However, a SAN tends to become congested due to changes in the workload of hosted applications with an increase in data and storage requirements. The SAN traffic can in some situations become unpredictable. For example, sudden spikes in SAN bandwidth can occur due to additional data protection requirements, which can result in activities such as host-based migrations, replications and/or backups occurring at various intervals.

Multi-pathing software residing on the host device (e.g., a server) is utilized in illustrative embodiments to monitor SAN utilization and application workload and to detect SAN congestion, SAN failures and other designated SAN conditions. This monitoring illustratively identifies points of congestion and can be used to recognize the need for correction in SAN configuration to provide additional bandwidth such that primary application workloads are not impacted. Such correction can involve, for example, providing additional SAN connectivity for these hosts. However, the additional connectivity might be of a temporary need for that point in time.

Some embodiments herein therefore configure the host multi-pathing software to drive automatic and dynamic configuration changes, so as to greatly reduce the dependency on administrators. The change in configuration can be made based on temporary needs, on an on-demand basis, or to resolve any imbalances seen across host to storage targets. PowerPath® management software like PPMA or even CloudIQ could derive a datacenter view of SAN utilization collected from PowerPath® hosts and make decisions as to configuration changes that are required for an efficient SAN connectivity. CloudIQ is a cloud-based application that implements intelligent and predictive analytics to proactively monitor the health of Dell EMC storage systems, and it can be used in some embodiments disclosed herein, in place or in addition to PPMA or another type of MPIO management station.

Some embodiments disclosed herein configure multi-pathing software such as PowerPath® running on host devices 102 to interact with storage array 105 for dynamic configuration of paths and target ports based on fabric conditions of the SAN 104.

An example of an algorithm collectively performed by the host devices 102 utilizing their respective instances of SAN monitoring logic 115 and the storage array 105 using its notification processing logic 121 and configuration change control logic 122, illustratively includes the following steps:

1. It is assumed in some embodiments that PowerPath® software is installed on the host devices 102 and handles load balancing of IO operations across available paths using PowerPath® load balancing functionality. Although PowerPath® software suitably modified to implement techniques as disclosed herein is used in this example algorithm, its use should not be viewed as limiting, and other types of multi-pathing software, or more generally multi-path layers, can be used. Such suitably modified PowerPath® software is an example of what is more generally referred to herein as a "multi-path layer." The remaining description of the example algorithm with therefore refer to operations performed by a multi-path layer. The multi-path layer illustratively comprises the MPIO drivers 112 and in some embodiments can comprise a PPMA implemented by MPIO management station 116, although other embodiments need not include PPMA or an MPIO management station.

2. The multi-path layer in some embodiments is configured to update the storage array 105 on the current path and fabric state either via PPMA (e.g., an appliance acting as a centralized management server for all PowerPath® installed hosts) implemented by the MPIO management station 116, or directly to the storage array 105 via VU SCSI commands. Examples of such commands include the following:

(a) The multi-path layer detects any "flaky" bus details (e.g., initiator-target pairs) in the SAN fabric and this information is shared with PPMA. If "flaky" bus reports from multiple hosts identify the same target port, then chances of that target port being flaky is high. The PPMA therefore triggers action on the storage array 105 for necessary configuration changes. Here, the term "flaky" is meant to encompass any significant detectable performance inconsistency associated with a given initiator-target pair, illustratively corresponding to a given path through the SAN 104.

(b) Fabric congestion is illustratively communicated to the host via FPINs, and the multi-path layer can be configured to report such received notifications with corresponding bus details (e.g., initiator-target pairs) to the PPMA. The PPMA illustratively determines one or more target ports for which FPINs were not reported and recommends that the storage array perform configuration changes for the affected host.

(c) In the case of increased SAN traffic due to additional workload triggered from host-based migrations or other similar activities, the multi-path layer illustratively identifies the impacted storage array ports and shares those details to the PPMA. The PPMA recommends necessary configuration changes in the storage array to achieve quicker migration and thereby reducing the impact on primary application workload.

(d) During port offline activity for IO card replacement, the multi-path layer detects these activities and can report same to the PPMA. Such IO cards are also referred to as SLICs and card types can include, for example, 10 GbE, Fibre Channel, iSCSI, SAS, etc. The PPMA decides on the need for additional path requirements and makes a request to the storage array 105 for configuration changes. Such a request is considered an example of what is more generally referred to herein as a "notification" generated by a multi-path layer. Again, such notifications can be sent directly from the MPIO drivers 112 of the host devices 102 to the storage array 105, thereby bypassing the PPMA of the MPIO management station 116.

3. The storage array 105 on receiving notifications from the PPMA of the type described above takes the necessary actions. For example, the storage array 105 can make use of target ports which are less utilized for new configuration changes or a storage administrator can also reserve target ports, so that always reserved ports can be used whenever the PPMA suggests a configuration change to the storage array. The storage array 105 illustratively identifies one or more target ports which can be used and adds them to port groups of the host which needs new configuration. This enables the host to see LUNs via newly added target ports once zones are updated. The storage array 105 also consumes all other inputs from the PPMA to make intelligent decisions. Details from the PPMA include information on target ports which have "flaky" reports, higher response time, congestion notifications received, etc.

4. The storage array 105 triggers zone configuration changes. Since the storage array 105 had already performed necessary changes to the port group by adding new target ports for the host, the storage array 105 initiates a zone change as per new configuration change. In some embodiments, target driven zoning (TDZ) is used, and the storage array 105 can trigger TDZ and based on port configuration in the storage group, zones are constructed and activated.

5. The multi-path layer detects a new configuration and claims the new paths or updated configuration and starts consuming the same during IO dispatch.

As indicated previously, at least a portion of the above-described notifications which are provided by the multi-path layer via the PPMA can additionally or alternatively be sent directly from the MPIO drivers of the host devices to the storage array via VU SCSI commands or other storage access protocol commands.

Accordingly, although VU commands are used in illustrative embodiments herein, other types of commands can be used in other embodiments. For example, various types of log sense, mode sense and/or other commands, possibly including one or more commands of a standard storage access protocol such as the above-noted SCSI and NVMe access protocols, can be used in other embodiments.

Initiated configuration changes are illustratively event and time-bound and can be reverted once the host is no longer in the particular situation that triggered the change. For example, if a configuration change is triggered due to an active migration, after the migration is completed the PPMA can initiate reversion of the modified configuration. The same applies for a wide variety of other use cases, such as use cases involving SLIC or IO card replacement or other such event-based triggers.

The steps of the above-described example algorithm are illustrative only, and should not be considered limiting in any way.

Illustrative embodiments provide significant advantages over conventional practice. For example, in today's datacenter, application workload and SAN traffic changes are unpredictable and administrators have to monitor for alerts/alarms in the SAN and then are required to manually correct the congestion or facilitate other types of improvements in SAN connectivity. This dependency on administrators not only takes time but is also a never-ending day-to-day activity for administrators. Illustrative embodiments disclosed herein remove this dependency as much possible to provide quick resolution to SAN changes as per application needs and provide a quick turnaround.

With automated SAN correction adhering to the requirement of real-time application workload in some embodiments disclosed herein, users can build self-sustainable and resilient SAN infrastructure, cutting down the dependency on SAN administrators and providing a quick turnaround to SAN alerts/alarms.

Moreover, illustrative embodiments can significantly improve the host IO performance during seamless migrations and numerous other detectable conditions, such as replications, backups, and so on.

Portions of the above-described algorithm and other related techniques and functionality are illustratively implemented by a given MPIO driver on a corresponding host device, and similarly by other MPIO drivers on respective other host devices. Such MPIO drivers illustratively form a multi-path layer comprising multi-pathing software of the host devices. Other types of multi-pathing software and host drivers can be used in other embodiments.

Additional examples of dynamic configuration change control arrangements will be described elsewhere herein in conjunction with the embodiments of FIGS. 2 through 4. Other types of dynamic configuration change control arrangements can be used in other embodiments.

These and other functions related to dynamic configuration change control that are referred to herein as being performed by or under the control of the storage array 105 and MPIO drivers 112 can in some embodiments be performed at least in part outside of the storage array 105 and MPIO drivers 112.

The above-described functions associated with dynamic configuration change control in the MPIO driver 112-1 in some embodiments are carried out at least in part under the control of its SAN monitoring logic 115-1, illustratively operating in cooperation with path selection logic 114-1. For example, the SAN monitoring logic 115-1 is illustratively configured to control performance of portions of an algorithm comprising the steps of the process in the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for dynamic configuration change control.

Accordingly, functionality described above in the context of the first MPIO driver 112-1 and the first host device 102-1 is assumed to be similarly performed by each of the other MPIO drivers 112 and/or more generally by their respective host devices 102.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support dynamic configuration change control.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of path selection logic 114 and SAN monitoring logic 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
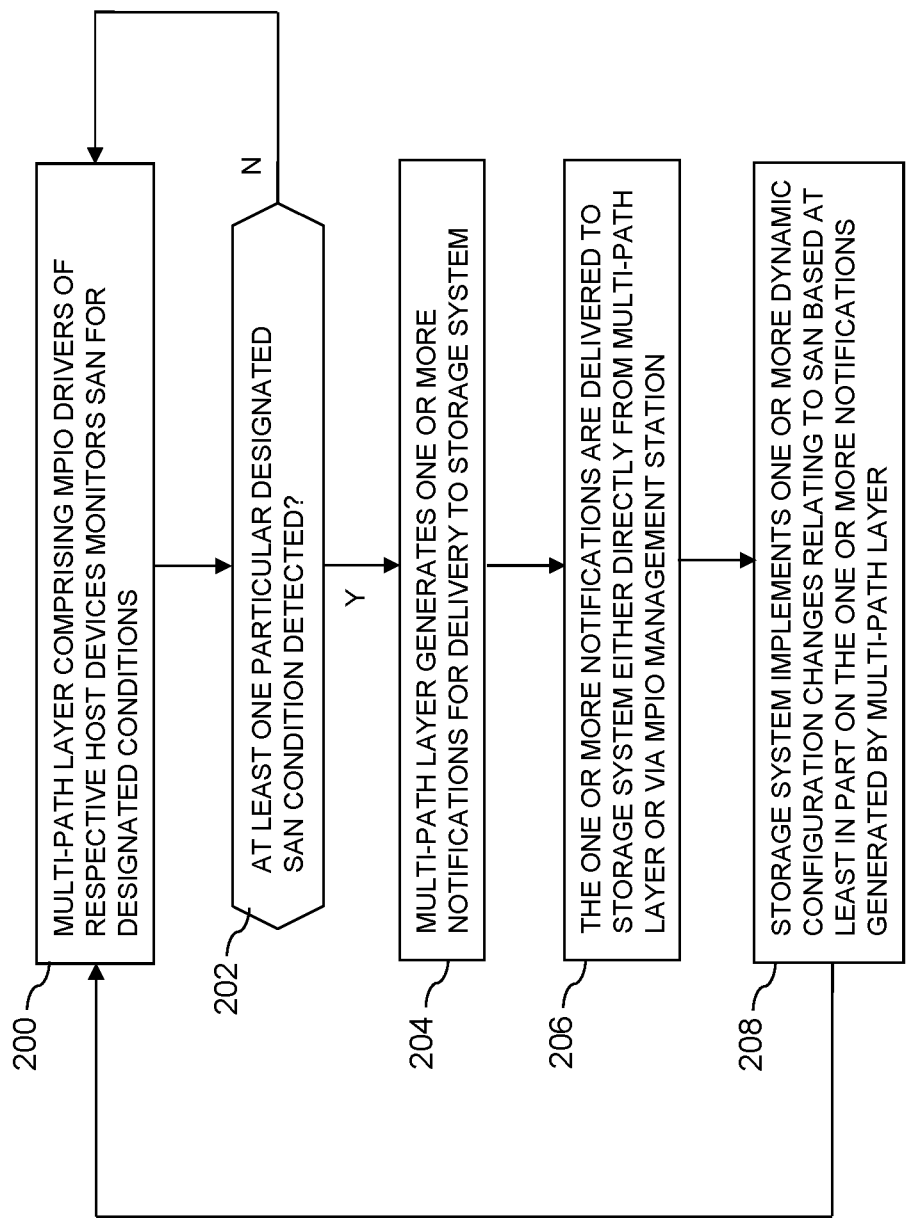
FIG. 2 is a flow diagram of a process for dynamic configuration change control using multi-path layer notifications in an illustrative embodiment.

The steps of the FIG. 2 process are illustratively performed at least in part by or under the control of a multi-path layer comprising multiple MPIO drivers of respective host devices, a storage array or other storage system, and possibly one or more additional components such as an external server comprising an MPIO management station. Other arrangements of additional or alternative system components can be configured to perform at least portions of one or more of the steps of the FIG. 2 process in other embodiments.

In step 200, the multi-path layer comprising MPIO drivers of respective host devices monitor a SAN for designated conditions. The MPIO drivers illustratively control the delivery of storage access protocol commands from the multiple host devices to at least one storage array of a storage system via the SAN. For example, different host devices may each target the same storage device of the storage array with particular ones of their storage access protocol commands, such as SCSI commands or NVMe commands.

In step 202, a determination is made as to whether or not at least one particular designated SAN condition has been detected by the multi-path layer. If at least one such condition has been detected, the process moves to step 204, and otherwise returns to step 200 to continue monitoring the SAN. The monitoring of the SAN and associated detection of particular designated SAN conditions may also continue in parallel with performance of step 204 and other subsequent steps. In other words, the monitoring of the SAN in step 200 and associated detection may be performed substantially continuously during execution of the process of FIG. 2, notwithstanding the performance of other steps of the process.

In step 204, the multi-path layer generates one or more notifications for delivery to the storage system. For example, such notifications can be generated in one or more of the MPIO drivers of the multi-path layer, and can take the form of VU commands of a storage access protocol, or other types of commands. A wide variety of additional or alternative notifications can be generated in a multi-path layer in other embodiments.

In step 206, the one or more notifications are delivered to the storage system, either directly from the multi-path layer or indirectly via an MPIO management station. In other embodiments, at least portions of the MPIO management station can be considered part of the multi-path layer. The term "multi-path layer" as used herein is therefore intended to be broadly construed.

In step 208, the storage system implements one or more dynamic configuration changes relating to the SAN based at least in part on the one or more notifications generated by the multi-path layer. The process then returns to step 200 to continue monitoring the SAN. As indicated above, the monitoring of the SAN and associated detection of particular designated SAN conditions may also continue in parallel with performance of steps such as steps 204 through 208. Accordingly, the monitoring of the SAN in step 200 and the associated determination in step 202 can continue to be performed in the background while other steps of the process such as 204 through 208 are performed.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for dynamic configuration change control. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different dynamic configuration change control arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
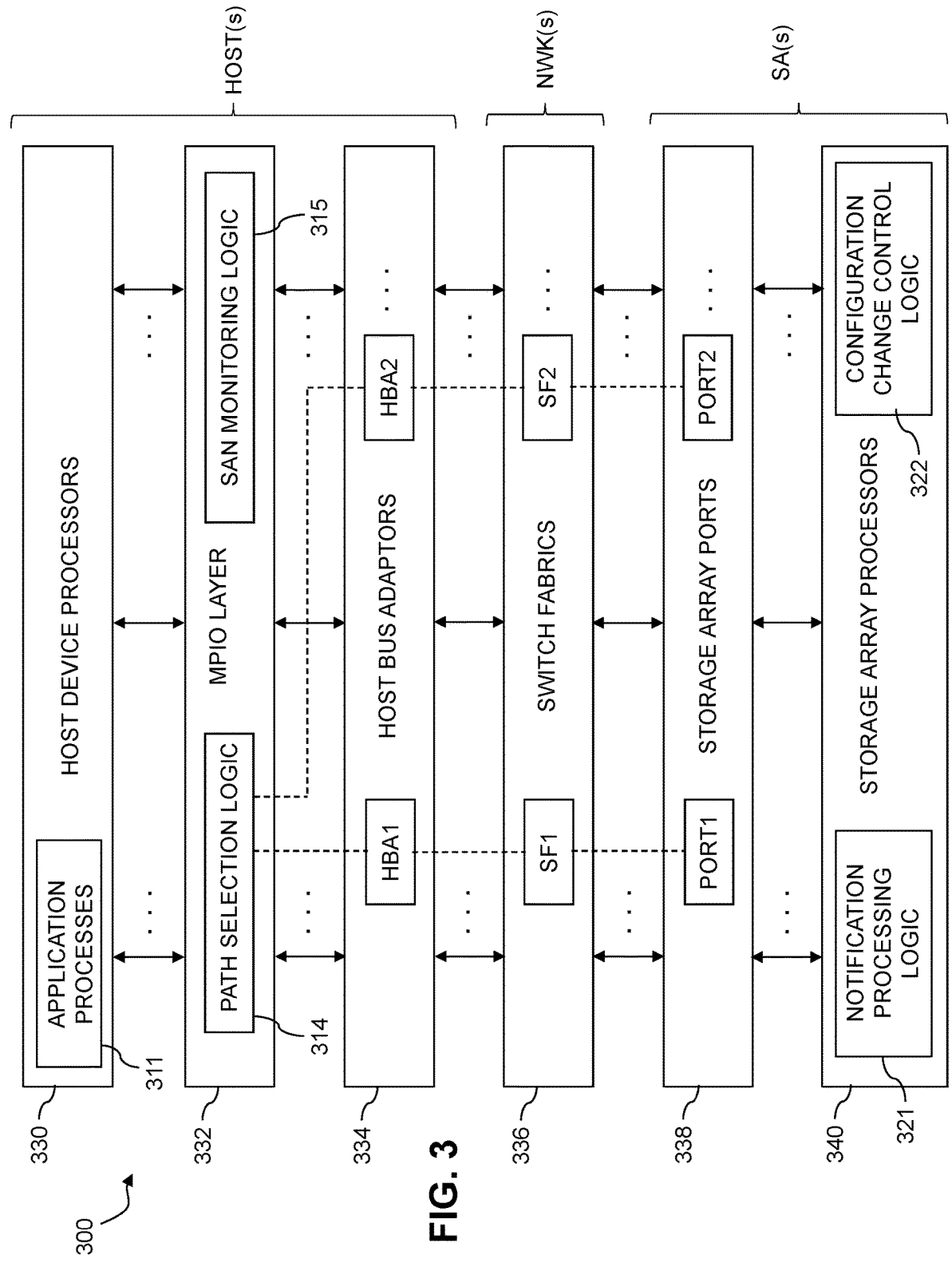
FIG. 3 is a block diagram showing multiple layers of a layered system architecture that incorporates functionality for dynamic configuration change control using multi-path layer notifications in an illustrative embodiment.

Referring now to FIG. 3, another illustrative embodiment is shown. In this embodiment, an information processing system 300 comprises host-side elements that include application processes 311, path selection logic 314 and SAN monitoring logic 315, and storage-side elements that include notification processing logic 321 and configuration change control logic 322. There may be separate instances of one or more such elements associated with each of a plurality of system components such as host devices and storage arrays of the system 300.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs"). The storage array processors of the storage array processor layer 340 may be viewed as corresponding to one or more storage controllers such as the storage controllers 120 of the storage array 105.

In a manner similar to that described elsewhere herein, the SAN monitoring logic 315 illustratively monitors SAN traffic between the host devices and a plurality of storage devices of one or more storage arrays, such as storage devices 106 of storage array 105, based on SCSI, NVMe or other access protocol commands generated in the host devices and targeting those storage devices. Particular designated SAN conditions are detected by the SAN monitoring logic 315, and utilized to generate one or more notifications for delivery to the storage arrays, for example, directly from the MPIO layer 332 and/or indirectly via one or more external servers that are not shown in the figure. The notification processing logic 321 receives and processes such notifications from the MPIO layer 332, and provides corresponding signaling to configuration change control logic 322 for use in implementing one or more dynamic configuration changes relating to the SAN based at least in part on the one or more notifications generated by the MPIO layer 332.

The system 300 in this embodiment therefore implements dynamic configuration change control utilizing the notification processing logic 321 and the configuration change control logic 322, as well as one or more MPIO drivers of the MPIO layer 332, and their associated instances of SAN monitoring logic 315. The application processes 311 generate IO operations that are processed by the MPIO layer 332 for delivery to the one or more storage arrays over the SAN comprising switch fabrics of switch fabric layer 336. Paths are determined by the path selection logic 314 for sending such IO operations to the one or more storage arrays. These IO operations include IO operations for which SAN traffic is monitored by the SAN monitoring logic 315 as previously described.

The MPIO layer 332 is an example of what is also referred to herein as a multi-path layer, and comprises one or more MPIO drivers implemented in respective host devices. Each such MPIO driver illustratively comprises respective instances of path selection logic 314 and SAN monitoring logic 315 configured as previously described. Additional or alternative layers and logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment selects paths for delivery of IO operations to the one or more storage arrays having the storage array ports of the storage array port layer 338. More particularly, the path selection logic 314 determines appropriate paths over which to send particular IO operations to particular logical storage devices of the one or more storage arrays.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Figure 4:
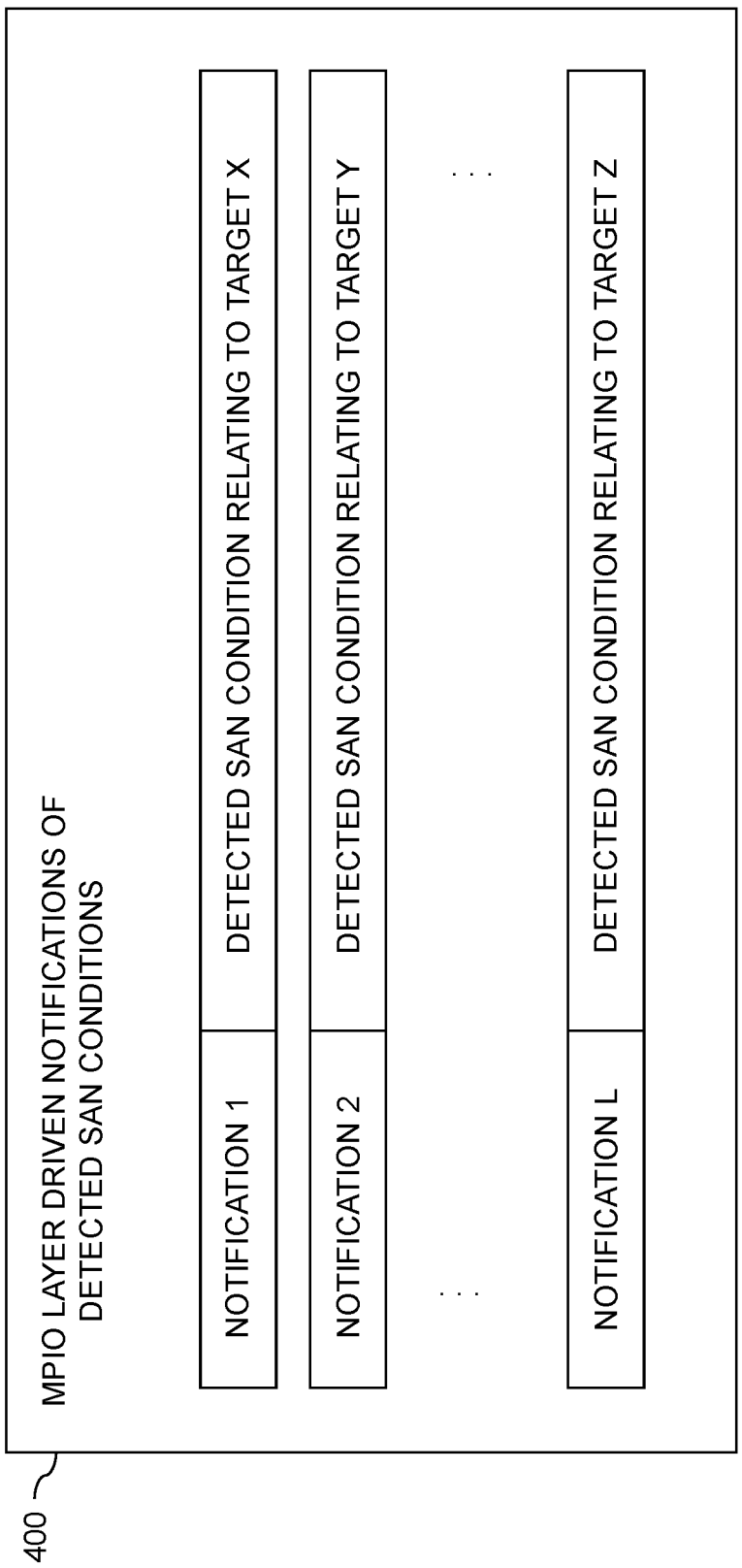
FIG. 4 shows an example of multi-path layer notifications for use in dynamic configuration change control in an illustrative embodiment.

Referring now to FIG. 4, examples of notifications 400 of detected SAN conditions are shown. The notifications 400 are illustratively generated in the MPIO layer 332, and are therefore referred to herein as MPIO layer driven notifications. The notifications 400 in this example include multiple notifications denoted Notification 1, Notification 2, . . . Notification L. Notification 1 includes information identifying a detected SAN condition relating to a particular target denoted as Target X. Similarly, Notification 2 includes information identifying a detected SAN condition relating to a particular target denoted as Target Y, and Notification L includes information identifying a detected SAN condition relating to a particular target denoted as Target Z. These notifications are illustratively generated by instances of SAN monitoring logic 315 in respective ones of a plurality of MPIO drivers of MPIO layer 332. The targets such as Target X, Target Y and Target Z illustratively denote respective targets of corresponding initiator-target pairs, with the initiators comprising HBAs of the HBA layer 334 and the targets comprising storage array ports of the storage array port layer 338. As described elsewhere herein, such initiator-target pairs are associated with respective paths selected by instances of path selection logic 314 in respective ones of a plurality of MPIO drivers of MPIO layer 332, for delivery of IO operations from the host devices to the storage arrays.

The notifications 400 can be communicated directly from the MPIO layer 332 to the storage arrays, illustratively as VU commands or other types of commands in one or more storage access protocols. Additionally or alternatively, such notifications can be delivered indirectly via one or more external servers, such as an external server implementing an MPIO management station such as MPIO management station 116 of FIG. 1. Such an MPIO management station, or portions thereof, can in some embodiments be considered part of MPIO layer 332 or another type of multi-path layer as that term is broadly defined herein.

Within the storage array processors layer 340, the notifications 400 are received and processed by the notification processing logic 321 and utilized in implementing configuration changes under the control of the configuration change control logic 322.

The particular arrangement of notifications shown in FIG. 4 is only an example, and numerous other types and arrangements of notifications and associated detected SAN conditions can be utilized in other embodiments. For example, an MPIO management station can receive notifications from multiple MPIO drivers, and generate corresponding notifications for delivery to a storage array, possibly combining information from multiple MPIO driver notifications into a single notification for delivery to the storage array. All such notifications are considered to be notifications generated by a multi-path layer as that term is broadly used herein.

The above-described processes, algorithms and other features and functionality disclosed herein are presented by way of illustrative example only, and other embodiments can utilize additional or alternative arrangements.

Also, as mentioned previously, different instances of the above-described processes, algorithms and other dynamic configuration change control techniques can be performed using different system components. For example, notification generation and/or delivery in some embodiments can be implemented at least in part using one or more servers that are external to a storage array 105 or other type of storage system. Also, SAN monitoring logic can be implemented using other types of host drivers, such as, for example, iSCSI drivers, or more generally other host device components.

The particular dynamic configuration change control arrangements described above are therefore presented by way of illustrative example only. Numerous alternative arrangements of these and other features can be used in implementing the dynamic configuration change control in other illustrative embodiments.

The illustrative embodiments disclosed herein can provide a number of significant advantages relative to conventional arrangements.

For example, some embodiments are advantageously configured to minimize or otherwise avoid the need for manual administrator intervention in response to dynamic and potentially unpredictable changes in application workload and associated SAN traffic.

Additionally or alternatively, illustrative embodiments provide an automated and rapid response to SAN congestion and other types of SAN conditions through utilization of a multi-path layer of multiple host devices to detect such conditions and to generate appropriate change control related notifications to a storage system.

Illustrative embodiments can significantly improve host IO performance during seamless migrations and responsive to numerous other detectable conditions, such as high traffic conditions associated with replications, backups, and other activities commonly utilized to provide high availability in a storage system.

Functionality associated with dynamic configuration change control using multi-path layer notifications as disclosed herein can be implemented in a storage system, in a host device, or partially in a storage system and partially in a host device, and additionally or alternatively using other arrangements of one or more processing devices each comprising at least a processor and a memory coupled to the processor.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and SAN monitoring logic 115 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, SAN monitoring logic, notification processing logic, configuration change control logic, and additional or alternative components. Also, the particular configurations of system and device elements and associated processing operations illustratively shown in the drawings can be varied in other embodiments. For example, a wide variety of different host device and storage system configurations and associated dynamic configuration change control arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   at least one processing device comprising a processor coupled to a memory;
   where the at least one processing device is configured:
   to monitor, in a multi-path layer of the at least one processing device, a storage area network through which one or more host devices access storage devices of a storage system; and
   responsive to at least one particular detected condition of the storage area network, to generate in the multi-path layer one or more notifications for delivery to the storage system;
   wherein the storage system implements one or more dynamic configuration changes relating to the storage area network based at least in part on the one or more notifications generated in the multi-path layer; and
   wherein at least a portion of the one or more notifications are delivered indirectly from one or more multi-path input-output drivers of the multi-path layer to the storage system via one or more external servers.

2. The apparatus of claim 1 wherein a given one of the one or more multi-path input-output drivers implemented in a corresponding one of the host devices is configured to control delivery of input-output operations to the storage devices of the storage system over selected ones of a plurality of paths through the storage area network.

3. The apparatus of claim 2 wherein the paths correspond to respective initiator-target pairs, with the initiator of a particular one of the initiator-target pairs comprising a designated host bus adaptor (HBA) of a given one of the host devices and the target of the particular one of the initiator-target pairs comprising a designated storage array port of the storage system.

4. The apparatus of claim 1 wherein the at least one particular detected condition relates to at least one of a plurality of initiator-target pairs.

5. The apparatus of claim 1 wherein the one or more external servers comprise a centralized management server coupled to each of the host devices and configured to communicate with the multi-path input-output drivers of the multi-path layer.

6. The apparatus of claim 1 wherein the at least one particular detected condition comprises an absence of receipt by the multi-path layer of fabric performance impact notifications relating to at least one of a plurality of initiator-target pairs.

7. The apparatus of claim 1 wherein the at least one particular detected condition comprises an increased level of storage area network traffic, relative to a normal level of storage area network traffic for at least one of a plurality of initiator-target pairs, that is determined by the multi-path layer to be attributable to a host-based migration of one or more storage volumes of the storage system.

8. The apparatus of claim 7 wherein the one or more notifications comprise information identifying the at least one initiator-target pair that is experiencing the increased level of storage area network traffic.

9. The apparatus of claim 1 wherein the one or more dynamic configuration changes implemented by the storage system comprise at least one of:
switching at least one target storage array port of at least one initiator-target pair to a different target storage array port; and
executing a zone configuration change.

10. An apparatus comprising:
at least one processing device comprising a processor coupled to a memory;
where the at least one processing device is configured:
to monitor, in a multi-path layer of the at least one processing device, a storage area network through which one or more host devices access storage devices of a storage system; and
responsive to at least one particular detected condition of the storage area network, to generate in the multi-path layer one or more notifications for delivery to the storage system;
wherein the storage system implements one or more dynamic configuration changes relating to the storage area network based at least in part on the one or more notifications generated in the multi-path layer; and
wherein different multi-path input-output drivers in different ones of the host devices detect respective different conditions relating to respective different ones of a plurality of initiator-target pairs and wherein the one or more notifications generated in the multi-path layer collectively identify a common target from among the targets of the different ones of the initiator-target pairs.

11. The apparatus of claim 10 wherein the one or more dynamic configuration changes implemented by the storage system comprise one or more dynamic configuration changes that at least temporarily modify one or more characteristics relating to a particular storage array port corresponding to the common target.

12. The apparatus of claim 10 wherein at least a portion of the one or more notifications are delivered directly from one or more of the multi-path input-output drivers of the multi-path layer to the storage system over the storage area network.

13. The apparatus of claim 12 wherein at least a portion of the one or more notifications are delivered from the one or more multi-path input-output drivers of the multi-path layer to the storage system in the form of vendor unique commands of a specified storage access protocol.

14. A computer program product comprising a non-transitory processor-readable storage medium having stored therein program code of one or more software programs, wherein the program code, when executed by at least one processing device comprising a processor coupled to a memory, causes the at least one processing device:
to monitor, in a multi-path layer of the at least one processing device, a storage area network through which one or more host devices access storage devices of a storage system; and
responsive to at least one particular detected condition of the storage area network, to generate in the multi-path layer one or more notifications for delivery to the storage system;
wherein the storage system implements one or more dynamic configuration changes relating to the storage area network based at least in part on the one or more notifications generated in the multi-path layer; and
wherein at least a portion of the one or more notifications are delivered indirectly from one or more multi-path input-output drivers of the multi-path layer to the storage system via one or more external servers.

15. The computer program product of claim 14 wherein a given one of the one or more multi-path input-output drivers implemented in a corresponding one of the host devices is configured to control delivery of input-output operations to the storage devices of the storage system over selected ones of a plurality of paths through the storage area network.

16. The computer program product of claim 14 wherein the one or more dynamic configuration changes implemented by the storage system comprise at least one of:
switching at least one target storage array port of at least one initiator-target pair to a different target storage array port; and
executing a zone configuration change.

17. A method comprising:
monitoring, in a multi-path layer of at least one processing device comprising a processor coupled to a memory, a storage area network through which one or more host devices access storage devices of a storage system; and
responsive to at least one particular detected condition of the storage area network, generating in the multi-path layer one or more notifications for delivery to the storage system;
wherein the storage system implements one or more dynamic configuration changes relating to the storage area network based at least in part on the one or more notifications generated in the multi-path layer; and
wherein at least a portion of the one or more notifications are delivered indirectly from one or more multi-path input-output drivers of the multi-path layer to the storage system via one or more external servers.

18. The method of claim 17 wherein a given one of the one or more multi-path input-output drivers implemented in a corresponding one of the host devices is configured to control delivery of input-output operations to the storage devices of the storage system over selected ones of a plurality of paths through the storage area network.

19. The method of claim 17 wherein the one or more dynamic configuration changes implemented by the storage system comprise at least one of:
switching at least one target storage array port of at least one initiator-target pair to a different target storage array port; and
executing a zone configuration change.

20. The method of claim 17 wherein different multi-path input-output drivers in different ones of the host devices detect respective different conditions relating to respective different ones of a plurality of initiator-target pairs and wherein the one or more notifications generated in the multi-path layer collectively identify a common target from among the targets of the different ones of the initiator-target pairs.

* * * * *